United States Patent [19]

Van Paesschen et al.

[11] 4,123,278

[45] Oct. 31, 1978

[54] POLYESTER FILM COATED WITH ADHESIVE POLYMER COMPOSITION

[75] Inventors: August J. Van Paesschen, Antwerp; Lucien J. Van Gossum, Kontich, both of Belgium

[73] Assignee: Agfa-Gevaert N.V., Mortsel, Belgium

[21] Appl. No.: 778,736

[22] Filed: Mar. 17, 1977

[30] Foreign Application Priority Data

Mar. 19, 1976 [GB] United Kingdom ............... 11216/76

[51] Int. Cl.$^2$ ................................................ G03C 1/80
[52] U.S. Cl. ..................... 96/87 R; 428/483; 260/853; 260/852
[58] Field of Search ............... 96/87 R; 260/853, 852; 428/483

[56] References Cited

U.S. PATENT DOCUMENTS

| | | | |
|---|---|---|---|
| 2,884,342 | 4/1959 | Wolff | 260/853 |
| 2,953,475 | 9/1960 | Bergstedt | 260/852 |
| 3,345,206 | 10/1967 | Korpman | 260/852 |
| 3,751,280 | 8/1973 | Nerurkar et al. | 96/87 R |

*Primary Examiner*—John D. Welsh
*Attorney, Agent, or Firm*—William J. Daniel

[57] ABSTRACT

The adherence of hydrophilic layers to dimensionally stable polyester films is improved by means of an adhesive layer by a process comprising applying the adhesive layer to an at most monoaxially stretched polyester film, stretching the thus covered polyester film biaxially or in a direction perpendicular to the first stretching direction and heat-setting the thus treated film at 180°–225° C, whereafter a hydrophilic coating is applied to the heat-set adhesive layer. This adhesive layer consists essentially of about 25–60% by weight of a chlorine-containing copolymer, 15–40% by weight of a butadiene copolymer, and 2–10% by weight of a water-soluble melamine-formaldehyde or hydandoin-formaldehyde resin and is free of gelatin.

18 Claims, No Drawings

POLYESTER FILM COATED WITH ADHESIVE POLYMER COMPOSITION

This invention relates to coated film comprising a dimensionally stable polyester film support having a hydrophilic coating adherent thereto through the agency of an intermediate layer.

In order to ensure a perfect adhesion of hydrophilic layers such as photographic light-sensitive emulsion layers to dimensionally stable polyester film supports, i.e. polyester films that have been biaxially stretched and heat-set, it is known to apply several intermediate layers between the support and the light-sensitive emulsion layer. In most cases two intermediate layers are needed. The first one is a adhesive layer which is usually hydrophobic in order to exhibit good adhesion to the polyester film and at the same time possesses good attaching properties in respect of the second layer, called the subbing layer, which usually is formed to a great extent of a hydrophilic colloid such as gelatin.

It is known that the adhesion of the adhesive layer to the polyester film support can be promoted by different expedients, which can be used separately or in combination:

the use of chlorine-containing copolymers as binding agents for the adhesive layer;

the application of the adhesive layer before the stretching and heat-setting of the polyester film support, the latter occurring at a temperature of about 225° C.; and the addition to the coating composition of compounds, generally organic solvents, which attack the polyester film surface superficially.

Although such an adhesive layer attaches itself very tenaciously to a dimensionally stable polyester film support, a supplemental subbing layer is still needed. Indeed, the adhesion of a photographic gelatin-containing layer directly to the hydrophobic adhesive layer leaves much to be desired. This confirms the general rule that a good adhesion of a gelatin layer to a hydrophobic film surface can only be obtained when the surface of the hydrophobic film has been covered with a subbing layer that contains a sufficient amount of gelatin.

In the United Kingdom patent specification No. 1,421,758 filed May 26, 1972 by Agfa-Gevaert N. V. a single adhesive layer comprising a mixture of gelatin and of a chlorine-containing copolymer has been described, which adhesive layer is responsible for the good adhesion of hydrophilic layers to dimensionally stable polyester films.

The single adhesive layer comprises from 30% to 80% by weight of a chlorine-containing copolymer, from 5% to 30% by weight of gelatin, from 5% to 40% by weight of a plasticizer for gelatin and the said chlorine-containing copolymer and optionally up to 30% by weight of a metal-complexing antistatic agent.

The method described in the above United Kingdom Patent Specification for improving the adhesion of a hydrophilic layer to a dimensionally stable polyester film support comprises stretching the polyester film support in one direction, applying thereto said single adhesive layer, stretching the thus covered polyester film support in a direction perpendicular to the said one direction, heat-setting the thus-treated film at a temperature of from 180° to 220° C. and applying a hydrophilic layer to the said heat-set adhesive layer.

In some circumstances, the presence of gelatin in the single adhesive layer is responsible for some disadvantages. Indeed, it has been noticed that gelatin in the presence of ionic electroconductive compounds, possesses the property of somewhat decreasing the effective electroconductivity of these ionic electro-conductors. As a result thereof, it was necessary to add supplemental amounts of electro-conductive agent to the coating composition to make sure that the final layer obtains the desired electro-conductive properties.

However, this increased amount of electroconductors may produce some secondary disadvantages such as increasing the tackiness of the layer, producing a more pronounced tendency of the layer to become hazy, and decreasing the stability of the coating compositions.

It is an object of the present invention to provide a single adhesive layer improving the adhesion of hydrophilic layers to dimensionally stable polyester films, the coating composition for said single adhesive layer being free of gelatin.

According to the present invention a coated film is provided comprising a dimensionally stable polyester film support as defined hereinafter, the film support having a hydrophilic coating adherent thereto by way of an intermediate adhesive layer strongly adhering to the said film support, the adhesive layer consisting essentially from 25 to 60% by weight of a chlorine-containing copolymer, from 15 to 40% by weight of a butadiene copolymer and from 2 to 10% by weight of a water-soluble melamine-formaldehyde or hydantoin-formaldehyde resin and being free of gelatin.

By an adhesive layer strongly adhering to the film support is meant that when a pressure sensitive adhesive tape is pressed onto the adhesive layer and then torn off at an acute angle, the adhesive layer should be left undamaged, even after the adhesive layer had been scratched several times with a knife to facilitate the tearing off.

In a method of forming a dimensionally stable polyester film e.g. of polyethylene terephthalate, the polyester is extruded in the melt and quenched immediately on a cooling cylinder to form an amorphous film. This amorphous film is then stretched longitudinally and transversely, i.e. first longitudinally and then transversely, or first transversely and then longitudinally, or in both directions in a single operation, i.e. biaxially, the stretching being performed at 80° to 90° C. to form a crystalline film having its dimensions increased by 3 to 5 times. Subsequently, the film is heat-set at 180° to 225° C. while being kept under tension in both directions.

The present invention also comprises a method for preparing coated film comprising a dimensionally stable polyester film having a hydrophilic coating adherent thereto through the agency of an intermediate adhesive layer strongly adhering to said film support, which process comprises applying said adhesive layer to an at most monoaxially stretched polyester film support, stretching the thus covered polyester film support as necessary to impart biaxial stretching thereto, heat-setting the thus treated film at a temperature of 180° to 225° C., and applying a hydrophilic coating to said heat-set adhesive layer, wherein the adhesive layer is applied from a coating composition so that after coating and drying, it consists essentially of about 25 to 60% by weight of a chlorine-containing copolymer, about 15 to 40% by weight of a butadiene copolymer and about 2 to 10% by weight of a water-soluble melamine-formaldehyde or hydantoin-formaldehyde resin.

The chlorine-containing copolymers of the adhesive layer are preferably copolymers comprising 70 to 95% by weight of vinyl chloride and/or vinylidene chloride, 0.5 to 10% by weight of a hydrophilic monomer, and 0.5 to 25% by weight of at least one other copolymerizable monomer.

Suitable copolymerizable monomers are the esters of acrylic or methacrylic acid such as methyl, ethyl, butyl, hydroxyethyl, hydroxypropyl, glycidyl and cyanoethyl acrylate or methacrylate; further vinyl esters such as vinyl acetate and the vinyl ester of versatic acid, which is sold by Shell Chemical Co., under the trade name VEOVA 10 and is a branched chain vinyl carboxylic acid ester, which has a molecular weight of 198 and corresponds to the formula:

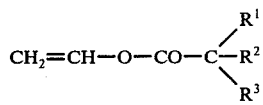

wherein $R^1$, $R^2$, and $R^3$ are alkyl groups having together 7 to 9 carbon atoms, and wherein only one of $R^1$, $R^2$, and $R^3$ may be a methyl group.

Other suitable copolymerizable monomers are acrylonitrile, N-t-butylacrylamide, acrolein, and vinyl sulphofluoride.

The hydrophilic monomer may be selected from acrylic acid, methacrylic acid, crotonic acid, maleic acid, fumaric acid, itaconic acid, the unsubstituted amides of acrylic and methacrylic acid, the monoalkyl esters of maleic acid, and vinyl pyrrolidone.

Suitable chlorine-containing copolymers are e.g. the copolymer of vinylidene chloride, N-t-butylacrylamide, n-butyl acrylate, and N-vinylpyrrolidone (70:23:3:4), the copolymer of vinylidene chloride, N-t-butylacrylamide, n-butyl acrylate, and itaconic acid (72:21:5:2), the copolymer of vinylidene chloride, N-t-butylacrylamide, and itaconic acid (88:10:2), the copolymer of vinylidene chloride, n-butylmaleimide, and itaconic acid (90:8:2), the copolymer of vinyl chloride, vinylidene chloride, and methacrylic acid (65:30:5), the copolymer of vinyl chloride, vinylidene chloride, n-butyl acrylate, and itaconic acid (63:30:5:2)

the copolymer of vinylidene chloride, methyl acrylate, and itaconic acid (88:10:2), the copolymer of vinyl chloride, vinylidene chloride, N-t-butylacrylamide, and itaconic acid (50:30:18:2).

The ratios given between parentheses in the above-mentioned copolymers are ratios by weight.

The above copolymers are only examples of the combinations that can be made with the different monomers. The invention is not limited at all to the copolymers enumerated.

The chlorine-containing copolymers are added in latex form to the coating composition for the adhesive layer. This latex is obtained by the emulsion polymerization of the different comonomers according to known emulsion polymerization techniques. The so-called primary dispersion directly formed upon emulsion polymerization is used as such, or after adaptation of its concentration. Greatly varying concentrations can be used depending on the final concentration and viscosity needed in the coating composition.

The butadiene copolymer preferably comprises 30 to 70% by weight of monomeric butadiene units. The balance is formed by units deriving from other ethylenically unsaturated hydrophobic monomers such as acrylonitrile, styrene, acrylic acid esters, methacrylic acid esters and acrolein. Moreover at most 5% of the comonomers may be formed by hydrophilic monomeric compounds, e.g. those mentioned above with respect to the chlorine containing copolymer.

Suitable butadiene copolymers are e.g.:
the copolymer of butadiene, methyl methacrylate, and itaconic acid (49:49:2)
the copolymer of butadiene and styrene (50:50)
the copolymer of butadiene and acrylonitrile (55:45)

Here as well the ratios between parentheses of the copolymers are ratios by weight.

The butadiene copolymers are formed by emulsion polymerization and the primary latex obtained is directly added as such or after adaptation of its concentration to the coating composition for the adhesive layer.

Melamine-formaldehyde resins are built up by condensation polymerization processes. Melamine is made to react with formaldehyde with the resulting formation of addition products such as methylol compounds. The latter can be made to react further, with concurrent elimination of water, to form medium-sized molecules that are still fusible and soluble. From these intermediates higher molecular weight products can be made by a step-wise condensation reaction finally leading to high molecular weight, insoluble, and infusible end products.

The melamine-formaldehyde resins used in the present invention are the intermediate, soluble varieties, which are added to the coating compositions for the adhesive layer in the form of their aqueous solutions.

The aqueous solutions of melamine-formaldehyde resins can be replaced by aqueous solutions of similarly produced hydantoin-formaldehyde resins.

Suitable products are e.g. the aqueous solutions of dimethyltrimethylol-melamine-formaldehyde resin and of dimethylhydantoin-formaldehyde resin.

The coating composition for the adhesive layer according to the present invention may include other compatible additives which are commonly used in known polymeric adhesive coating compositions. These additives include antistatic agents, stretch-improving agents, matting agents, coating aids spreading agents, thickening agents etc.

The coating composition of the adhesive layer preferably comprises from 10 to 25% by weight of antistatic agents based on the weight of the dry layer after coating. A large variety of antistatic agents can be used but it is preferred to use the sodium salts of sulphosalicylic acid and of 1,2-dihydroxy-3,5-disulphonic acid. Guanyl urea sulphate and the sodium salts of benzene sulphonic acid and of salicylic acid can be used as well. These compounds eliminate the static electricity charges that are easily formed on the polyester film support during manipulation of the film in the stretching and heat-setting operations, but at the same time, they improve the adhesion of the adhesive layer to the polyester film and to hydrophilic layers applied thereto.

The coated composition further preferably comprises from 4 to 15% by weight of stretch improving agents based on the weight of the dry layer. The term "stretch-improving agent" as used hereinbefore is defined as a plasticizing compound that is soluble or dispersible in water, that is photographically inert and that has the property of allowing layers formed from mixtures of chlorine-containing copolymers and of the other ingredients of the adhesive layer to be stretched, such layers remaining transparent after having been stretched and heat-set at relatively high temperatures. The action of these so-called stretch-improving agents is probably based on the known effects shown by external plasticizers, as described e.g. in the book "Plasticization and Plasticizer Processes", Advances in Chemistry, Series 48 — American Chemical Society, Washington D.C. - 1965.

Suitable stretch-improving agents are e.g. aliphatic polyhydroxy compounds such as glycerol, tri($\beta$-hydroxyethyl) glycerol, 1,1,1-tri(hydroxy-methyl)propane, 2-nitro-2-ethyl-1,3-propanediol, 1,3-dichloro-2-propanol, 1,2,4-butanetriol, 3-hydroxymethyl-2,4-dihydroxypentane, 1,2,6-hexanetriol, 2-hydroxymethyl-4-hydroxy-amyl alcohol, sorbitol, mannitol and polyvinyl alcohol.

Up to 3% by weight of a matting agent can be added to the coating composition based on the weight of the dry layer. These matting agents are added when there is a possibility that the final adhesive layer after having been stretched and heat-set might become tacky, thereby hampering its further treatment on the rollers of the coating apparatus. Suitable matting pigments that can be used in the coating composition for the adhesive layer are silicon dioxide e.g. in the form of kieselguhr or quartz powder, aluminium oxide, titanium(IV) oxide, silicon carbide, magnesium carbide, and glass powder (ground glass).

Equally suitable matting pigments are those obtained by the process of United Kingdom patent application No. 53,896/72, filed Nov. 22, 1972 by Agfa-Gevaert N. V., corresponding with published German patent application (DT-OS) No. 2,354,715, filed Nov. 2, 1973 by Agfa-Gevaert N. V. According to this process a water-insoluble, film-forming polymer is dissolved in a liquid, water-insoluble unsaturated monomer. This solution is dispersed by stirring in an aqueous solution of a hydrophilic colloid and of a dispersing agent, and continuing the stirring until polymer-in-monomer solution droplets of 1-10 $\mu$m are formed. Subsequently a free-radical forming polymerization initiator is added and while stirring is continued, the dispersion is heated to the decomposition temperature of the initiator, so that the water-insoluble monomer is polymerized in the droplets. In this way an aqueous dispersion of solvent-free polymer particles is formed, said dispersion possessing a very narrow particle size distribution. According to this process, an aqueous dispersion e.g. of poly(methyl methacrylate) particles can be obtained, in which 96.7% by weight of the polymer particles have a diameter comprised between 1.75 and 6.25 $\mu$m.

In the process of the present invention the actual particle size of the matting agents is not critical. Indeed, it is possible to use pigments having a small diameter, e.g. smaller than 0.1 $\mu$m, as well as relatively large pigments having diameters of approximately 3 $\mu$m. Very good results are obtained in both cases. However, we prefer to use pigment particles having a diameter below 0.1 $\mu$m. The stability of coating compositions containing these smaller pigment particles is greatly improved and the layers produced therewith show but slight haziness. This is i.a. the case for colloidal silicon dioxide dispersions, the particles of which are smaller than 0.1 $\mu$m.

According to a preferred embodiment of the invention the coating composition of the adhesive layer is formed by mixing the chlorine-containing copolymer and the butadiene copolymer in the form of their aqueous primary dispersions and in the proportions indicated above and adding the mixture to an aqueous solution of melamine-formaldehyde or of hydantoin-formaldehyde resin, whereupon the antistatic agent(s) the stretch-improving agent(s) and possibly the matting agent(s) are added thereto.

The coating composition of the adhesive layer may further comprise the known coating aids such as dispersing agents, spreading agents, and thickening agents, the latter in general being highly viscous water-soluble polymers having as sole object the adaptation of the viscosity of the coating composition to the desired degree. A survey of the thickening of latices and of the thickening agents that can be used has been given by Houben-Weyl in "Methoden der organischen Chemie", Makromolekulare Stoffe, Vol. 14/1, pages 519 and 536, Georg Thieme Verlag, Stuttgart (1961).

The coating composition for the adhesive layer preferably is applied in such a ratio that after the second stretching operation a layer having a thickness between 0.10 to 2 $\mu$m is obtained.

The coating composition for the adhesive layer is applied to an unstretched polyester film, or to a polyester film that has been oriented by stretching 3 to 5 times in but one direction, preferably a polyester film that has been stretched longitudinally. When the coating composition is applied to an unstretched film, the film is stretched together with the dried layer in longitudinal and transverse direction at a temperature of 80°-90° C. to preferably 3-5 times the original dimensions. Then it is conducted through a heat-setting zone where it is heated to 180°-225° C., while tension is exerted in both directions.

In case, however, the layer is applied to a polyester film already stretched in one direction — preferably longitudinally — the film is stretched in a direction perpendicular to the first stretching direction, preferably transversely, and heat-setting occurs in the same way. In both cases a clear and transparent polyester film is formed although a slight haze may be observed when matting agents have been added to the coating composition of the adhesive layer.

It follows that the single adhesive layer is preferably applied before the transverse stretching of the polyester film support. At that time the width of the film is one third to one fifth of the final width and the coating equipment for applying the single adhesive layer can be correspondingly narrow. This is also the case of the drying station to be used after the application of the adhesive layer.

The conductivity of adhesive layers according to the present invention is increased as compared with adhesive layers according to the above-mentioned U.K. Pat. No. 1,421,758 when similar quantities of antistatic agent are used. Indeed, for the single adhesive layer according to the process of the invention surface resistances comprised between $10^{11}$ and $10^{13}$ Ohm/square are found when measured at a relative humidity of 60%, whereas single adhesive layers according to the said United Kingdom Patent possess surface resistance of $10^{12}-10^{14}$ Ohm/square.

The surface resistance is measured by means of a pair of electrodes, both electrodes being 0.3 mm thick, having a width of 5 mm, and being placed in parallel position at a distance of 10 mm between each other. During the measurement a tension of 85 V is applied between the electrodes.

A supplementary advantage is obtained when gelatin is omitted from the coating composition for the adhesive layer, as is the case in the present invention. Aqueous coating solutions comprising gelatin can only be applied by heating them at temperatures above 35° C. This heating defavourably influences the stability of coating compositions comprising latices of chlorine-containing copolymers. Since in the present invention gelatin has been omitted, the coating compositions for the adhesive layer can be coated at room temperature and do not need to be heated above 35° C.

The hydrophilic layer deposited on the adhesive layer may be a simple hydrophilic colloid layer, e.g., a gelatin layer, a hydrophilic colloid layer containing light-sensitive silver halide, a hydrophilic polymer or colloid layer containing any kind of special additives such as antihalation dyestuffs, antistatic agents, electro-conductive pigments, photo-conductive insulating pigments, photo-sensitive semi-conductive pigments and matting agents. In magnetic recording materials the adhesive layer of the invention firmly binds layers containing magnetic material to the polyester film support. Also in electrophotographic materials, the adhesive layer is responsible for the firm bond of further layers to the polyester film support, which further layers do not show any tendency to peel off in the wet or in the dry state. The same applies to layers used in drawing materials.

The examples hereinafter are especially directed to the use of polyethylene terephthalate film as support for the adhesive layer and the hydrophilic layer or layers. The adhesive layer can, however, be applied to other polyester films, e.g. polyesters resulting from the polycondensation of glycol, or mixtures of glycols with terephthalic acid or mixtures of terephthalic acid with minor amounts of other dicarboxylic acids such as isophthalic acid, diphenic acid, and sebacic acid.

The invention is illustrated by the following examples.

EXAMPLE 1

A substantially amorphous polyethylene terephthalate film having a thickness of approximately 2.2 mm was formed by extrusion of molten polyethylene terephthalate at a temperature of about 280° C. on a quenching drum and was chilled to a temperature of about 75° C. and then stretched in the longitudinal direction over a differential speed roll stretching device to 3.5 times the initial dimension at a temperature of 84° C.

The thus stretched film was covered with a layer at a ratio of 70 sq.m/liter from the following coating composition:

| | |
|---|---|
| 20 % latex of co(vinyl chloride/vinylidene chloride/n-butyl acrylate/itaconic acid) (63:30:5:2 % by weight) | 300 ml |
| 20 % latex of co(butadiene/styrene) (50:50 % by weight) | 300 ml |
| 10 % aqueous solution of ULTRAVON W (trade name) | 30 ml |
| glycerol (50 % in water) | 15 ml |
| 40 % aqueous solution of dimethyl trimethylol melamine-formaldehyde resin | 25 ml |
| 10 % aqueous solution of the sodium salt of sulphosalicylic acid | 300 ml |
| water | 30 ml. |

ULTRAVON W is the trade name of CIBA-GEIGY A. G., Switzerland, for a dispersing agent consisting of the disodium salt of heptadecyl benzimidazole disulphonic acid.

After drying of the coating the film was stretched in a tenter frame to 3.5 times in the transverse direction at about 87° C. The final thickness of the film was about 0.180 mm.

The surface resistance of the dried layer at a relative humidity of 60% provided to be $3.60 \times 10^{11}$ Ohm/square.

The film was then conducted into an extension of the tenter frame, where it was heat-set while kept under tension at a temperature of 200° C. for about 1 minute. After heat-setting the coated film was cooled and wound up in the normal way.

The thus heat-set film was provided with a gelatin silver halide emulsion layer as used in photographic X-ray material. The layers of the photographic material thus obtained showed a very good adhesion to the polyester film support in wet as well as in dry state.

The adhesion in dry state was checked before and after the processing. The gelatin silver halide emulsion layer was scratched cross-wise by means of a sharp knife, whereafter an adhesive tape that was pressed over the scratches was torn off at once. The quality was approved only if but very small pieces of the photographic layer were torn off.

The adhesion in wet state was checked by scratching the material superficially and trying to rub off the gelatin layer with a finger after each step of the photographic processing (development, rinsing, fixing, rinsing). The gelatin layer should not be damaged during this rubbing.

EXAMPLE 2

The procedure of Example 1 was repeated except that the longitudinally stretched polyester film was covered with the following coating composition at a ratio of 70 sq.m/liter:

| | |
|---|---|
| 20 % latex of co(vinyl chloride/vinylidene chloride/n-butyl acrylate/itaconic acid) (63:30:5:2 % by weight) | 300 ml |
| 40 % latex of co(butadiene/acrylonitrile) (55:45 % by weight) | 150 ml |
| 20 % aqueous solution of polyvinyl alcohol | 100 ml |
| 10 % aqueous solution of the sodium salt of sulphosalicylic acid | 300 ml |
| 40 % aqueous solution of dimethyl trimethylol melamine-formaldehyde resin | 37.5 ml |
| glycerol (50 % in water) | 5 ml |
| 10 % aqueous solution of ULTRAVON W (trade name) | 7.5 ml |
| water | 100 ml. |

The surface resistance of the dried layer at a relative humidity of 60% was $2.40 \times 10^{11}$ Ohm/square.

After transverse stretching and heat-setting as described in Example 1 a gelatin silver halide emulsion layer as used in photographic X-ray materials was applied to the adhesive layer.

The layers showed a good adhesion to the film support in dry as well as in wet state.

EXAMPLE 3

The procedure of Example 1 was repeated except that the adhesive layer was coated from the following coating composition:

| | |
|---|---|
| 20 % latex of co(vinyl chloride/vinylidene chloride/n-butyl acrylate/itaconic acid) (63:30:5:2% by weight) | 198 ml |

-continued

| | |
|---|---|
| 20 % latex of co(butadiene/methyl methacrylate/ itaconic acid) (49:49:2 % by weight) | 198 ml |
| 40 % aqueous solution of dimethylhydantoin-formaldehyde resin | 25 ml |
| 20 % aqueous solution of polyvinyl alcohol | 66 ml |
| glycerol | 3 ml |
| 10 % aqueous solution of ULTRAVON W (trade name) | 7.5 ml |
| 10 % aqueous solution of the sodium salt of sulphosalicylic acid | 330 ml |
| colloidal silicon dioxide dispersion in water (particle size of 16–22 nm) | 10 ml |
| water | 200 ml. |

The surface resistance of the dried layer at 60% of relative humidity was $6.10 \times 10^{11}$ Ohm/square.

Excellent adhesion of the gelatin silver halide emulsion layer in dry as well as in wet state was obtained.

EXAMPLE 4

The procedure of Example 1 was repeated except that the adhesive layer was formed from the following coating composition:

| | |
|---|---|
| 20 % latex of co(vinylidene chloride/methyl acrylate/itaconic acid) (88:10:2 % by weight) | 350 ml |
| 20 % latex of co(butadiene/methyl methacrylate/ itaconic acid) (49:49:2 % by weight) | 125 ml |
| 40 % aqueous solution of dimethyl trimethylol melamine-formaldehyde resin | 37.5 ml |
| 70 % aqueous solution of sorbitol | 14.3 ml |
| 10 % aqueous solution of the sodium salt of sulphosalicylic acid | 330 ml |
| 10 % aqueous solution of ULTRAVON W (trade name) | 10 ml |
| SYTON T 30 (trade name) | 10 ml |
| water | 123,2 ml |

SYTON T 30 is the trade name of Monsanto for a silicon dioxide composed of particles having a specific surface area of about 150 sq.m/g and a particle size of 50–70 nm. Surface resistance of the dried layer at 60% of relative humidity: $4.30 \times 10^{11}$ Ohm/square.

An excellent adhesion of a lithographic photographic emulsion in dry and in wet state was obtained.

EXAMPLE 5

The procedure of Example 1 was repeated except that the adhesive layer was formed from the following coating composition:

| | |
|---|---|
| 20 % latex of co(vinylidene chloride/methyl acrylate/itaconic acid) (88:10:2 % by weight) | 350 ml |
| 20 % latex of co(butadiene/styrene) (50:50 % by weight) | 100 ml |
| 40 % aqueous solution of dimethyl trimethylol melamine-formaldehyde resin | 25 ml |
| glycerol (50 % in water) | 15 ml |
| 10 % aqueous solution of guanylurea sulphate | 200 ml |
| 10 % aqueous solution of ULTRAVON W (trade name) | 10 ml |
| 20 % aqueous dispersion of poly(methyl methacrylate) | 10 ml |
| water | 215 ml |

The aqueous dispersion of poly(methyl methacrylate) particles had been produced according to the method described in United Kingdom Patent Application 53,896/72, corresponding with published German Patent Application (DT-OS) No. 2,354,715 already mentioned hereinbefore. The particle size distribution of this matting agent was very narrow, 96.7% by weight of the particles possessing a diameter comprised between 1.75 and 6.25 μm.

The layers showed excellent adhesion in dry as well as in wet state.

EXAMPLE 6

The procedure of Example 1 was repeated except that the adhesive layer was formed from the following coating composition:

| | |
|---|---|
| 20 % latex of co(vinylidene chloride/ methyl acrylate/itaconic acid) (88:10:2 % by weight) adjusted to pH 8.15 with NH$_4$OH | 350 ml |
| 20% latex of co(butadiene/methyl methacrylate/itaconic acid) (49:49:2% by weight) adjusted to pH 8.15 with NH$_4$OH | 125 ml |
| 40% aqueous solution of dimethyl trimethylol melamine-formaldehyde resin | 20 ml |
| 70% aqueous solution of sorbitol | 18 ml |
| 10% aqueous solution of the sodium salt of sulphosalicylic acid | 330 ml |
| 10% aqueous solution of ULTRAVON W (trade name) | 25 ml |
| SYTON W30 (trade name) | 15 ml |
| water | 125 ml |

Surface resistance of the dried layer at 60% of relative humidity: $4.30 \times 10^{11}$ Ohm/square.

An excellent adhesion of a lithographic photographic emulsion in dry and in wet state was obtained.

EXAMPLE 7

The procedure of Example 1 was repeated except that the adhesive layer was formed from the following coating composition:

| | |
|---|---|
| 40% latex of co(vinylidene chloride/ methyl methacrylate/itaconic acid) (80:10:2% by weight) | 245 ml |
| 20% latex of co(butadiene/methyl methacrylate/itaconic acid) (49:49:2% by weight) | 175 ml |
| 40% aqueous solution of dimethyl trimethylol melamine-formaldehyde resin | 15.4 ml |
| 70% aqueous solution of sorbitol | 25.2 ml |
| 10% aqueous solution of the sodium salt of sulphosalicylic acid | 462 ml |
| 10% aqueous solution of ULTRAVON W (trade name) | 25 ml |
| water | 52.4 ml |

An excellent adhesion of a lithographic photographic emulsion layer in dry and in wet state was obtained.

We claim:

1. A coated film comprising a dimensionally stable polyester film support, said film support having a hydrophilic coating adherent thereto by way of a single intermediate adhesive layer strongly adhering to said film support, said adhesive layer consisting essentially of about 25 to 60% by weight of a chlorine-containing copolymer, about 15 to 40% by weight of a butadiene copolymer, and about 2 to 10% by weight of a water-soluble melamine-formaldehyde or hydantoin-formaldehyde resin and being free of gelatin.

2. A coated film according to claim 1, wherein the polyester film is a film of polyethylene terephthalate.

3. A coated film according to claim 1, wherein the chlorine-containing copolymer comprises 70 to 95% by weight of vinyl chloride and/or vinylidene chloride, 0.5 to 10% by weight of a hydrophilic monomer, and 0.5 to 25% by weight of at least one other copolymerizable monomer.

4. A coated film according to claim 3, wherein the chlorine-containing copolymer is a copolymer of vinylidene chloride, vinyl chloride, n-butyl acrylate, and itaconic acid (63:30:5:2% by weight).

5. A coated film according to claim 3, wherein the chlorine-containing copolymer is a copolymer of vinylidene chloride, methyl acrylate, and itaconic acid (88:10:2% by weight).

6. A coated film according to claim 1, wherein the butadiene copolymer is a copolymer of butadiene and styrene (50:50% by weight).

7. A coated film according to claim 1, wherein the butadiene copolymer is a copolymer of butadiene and acrylonitrile (55:45% by weight).

8. A coated film according to claim 1, wherein the butadiene copolymer is a copolymer of butadiene, methyl methacrylate and itaconic acid (49:49:2% by weight).

9. A coated film according to claim 1, wherein the melamine-formaldehyde resin is water-soluble dimethyl trimethylol melamine-formaldehyde resin.

10. A coated film according to claim 1, wherein the adhesive layer also comprises from 10 to 25% by weight of antistatic agent(s).

11. A coated film according to claim 10, wherein the antistatic agent is the sodium salt of sulphosalicylic acid or of 1,2-dihydroxy-3,5-disulphonic acid, or guanyl urea sulphate.

12. A coated film according to claim 1, wherein the adhesive layer also comprises from 4 to 15% by weight of at least one stretch-improving agent.

13. A coated film according to claim 12, wherein the stretch-improving agent is glycerol and/or polyvinyl alcohol, or sorbitol.

14. A coated film according to claim 1, wherein the adhesive layer also comprises a matting agent in an amount of at most 3% by weight.

15. A coated film according to claim 14, wherein the matting agent is colloidal silicon dioxide.

16. A coated film according to claim 1, wherein the hydrophilic coating applied to said adhesive layer is a light-sensitive gelatin silver halide emulsion layer.

17. A process for preparing coated film comprising a dimensionally stable polyester film support having a hydrophilic coating adherent thereto by way of an adhesive layer strongly adhering to said film support, which comprises applying said adhesive layer to an at most monoaxially stretched polyester film support, stretching the thus covered polyester film support as necessary to impart biaxial stretching thereto, heat-setting the thus treated film at a temperature of 180° to 225° C., and applying a hydrophilic coating to said heat-set adhesive layer, said adhesive layer consisting essentially of a gelatin-free mixture of from 25 to 60% by weight of a chlorine-containing copolymer, from 15 to 40% by weight of a butadiene copolymer, and from 2 to 10% by weight of a water-soluble melamine-formaldehyde or hydantoin-formaldehyde resin.

18. A process according to claim 17, wherein the adhesive layer is applied from an aqueous coating composition obtained by mixing aqueous dispersions formed by emulsion polymerization of the chlorine-containing copolymer and of the butadiene copolymer and an aqueous solution of the melamine-formaldehyde or hydantoin-formaldehyde resin.

* * * * *